United States Patent [19]

Eyster et al.

[11] 4,223,799
[45] Sep. 23, 1980

[54] RELEASABLE LOCKING MEANS FOR CLOSURE CAPS

[75] Inventors: Charles G. Eyster, York, Pa.; Holbrook C. Bissell, West Chester, Pa.

[73] Assignee: Time Saving Falls, Inc., York, Pa.

[21] Appl. No.: 47,245

[22] Filed: Jun. 11, 1979

Related U.S. Application Data

[63] Continuation-in-part of Ser. No. 963,584, Nov. 24, 1978, abandoned.

[51] Int. Cl.³ .................... B65D 51/00; B65D 43/26; E05B 47/00; F16B 37/14
[52] U.S. Cl. .................................. 220/230; 220/284; 220/228; 70/276; 292/251.5; 85/35; 215/201; 215/207; 215/215; 215/330
[58] Field of Search ............... 220/230, 284, 288; 85/32 R, 35; 215/330, 201, 207, 215; 70/276; 292/144, 251.5

[56] References Cited

U.S. PATENT DOCUMENTS

| | | | |
|---|---|---|---|
| 738,917 | 9/1903 | Kempien | 215/221 |
| 2,847,139 | 8/1958 | Christiansson et al. | 215/9 |
| 2,921,705 | 1/1960 | Dorsey | 215/9 |
| 3,060,786 | 10/1962 | Flower | 85/32 R |
| 3,376,992 | 4/1968 | Klapp, Sr. | 215/9 |
| 3,426,930 | 2/1969 | Hirschler | 215/9 |
| 3,732,147 | 1/1974 | Hallmann | 70/276 |
| 3,735,887 | 5/1973 | Morris | 215/9 |
| 3,794,204 | 2/1974 | Wehmeyer | 220/288 X |
| 3,837,525 | 9/1974 | Kobayashi | 70/276 X |
| 3,935,877 | 2/1976 | Franceschi | 220/284 X |

Primary Examiner—Steven M. Pollard
Attorney, Agent, or Firm—C. Hercus Just

[57] ABSTRACT

The present invention pertains to releasable locking mechanism for a hollow circular member such as a fill pipe for an oil tank and cup-shaped closure cap of non-magnetic material which is connectable to the hollow circular member, in combination with a locking member of ferrous material supported by said cap for axial movement vertically relative to the cap and hollow circular member but non-rotatable relative to the cap, one end of the locking member having a configuration that is engageable with the hollow circular member in non-rotatable relationship to prevent rotation of the cap with respect to the hollow circular member when the locking member is in the latter position, the locking member being adapted to be raised from said locking engagement with the hollow circular member by a magnet which may be mounted within a wrench for use with the cap to remove the same from the hollow circular member.

28 Claims, 28 Drawing Figures

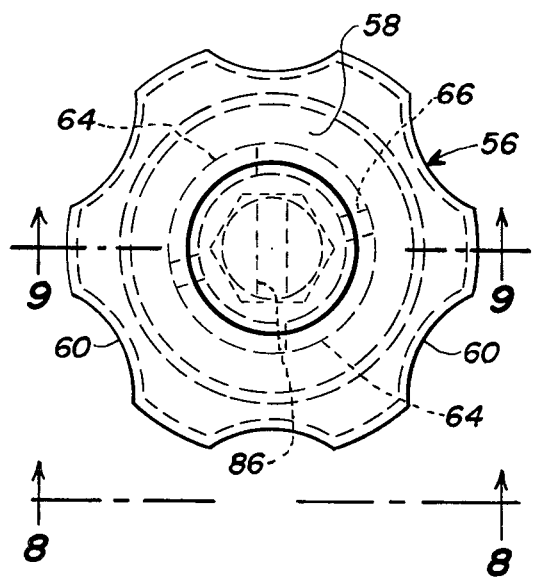
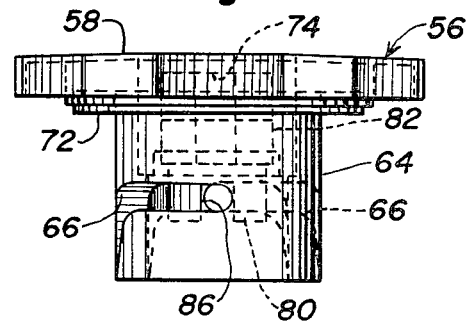
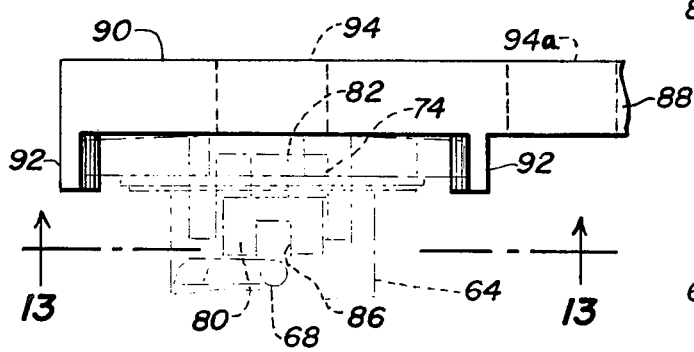
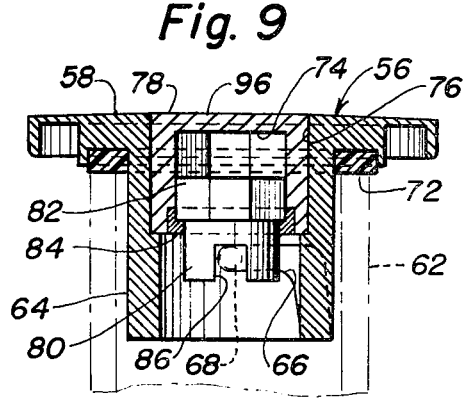
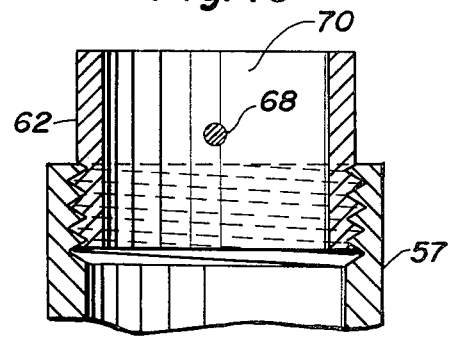
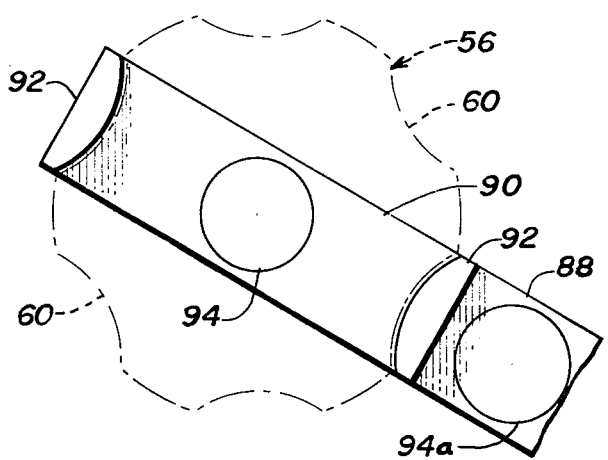
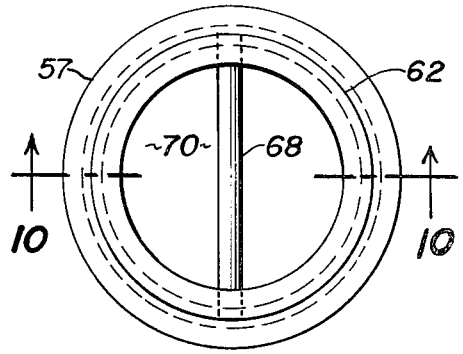

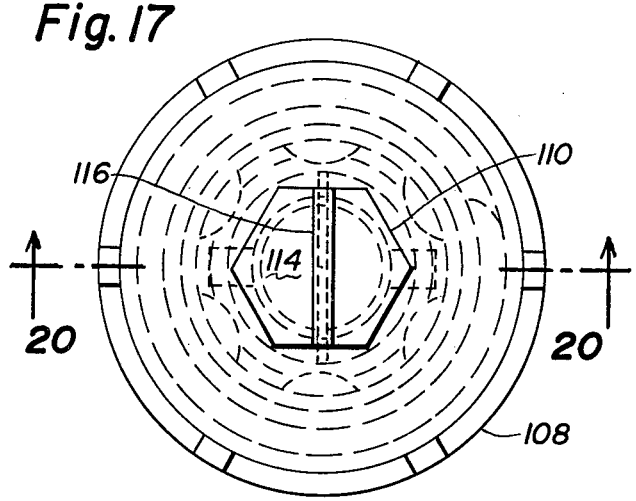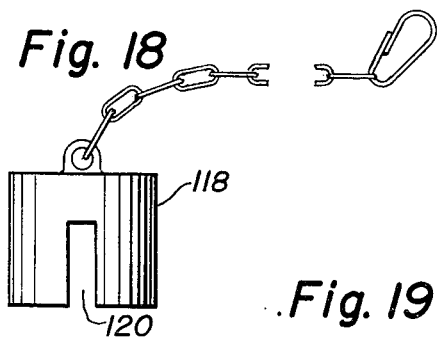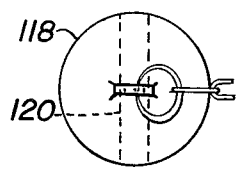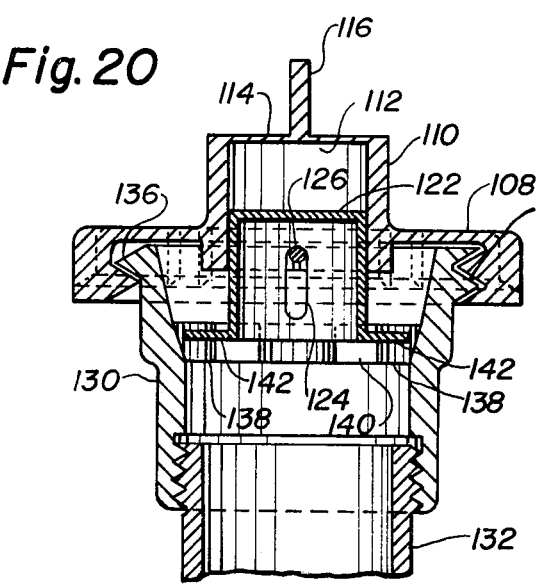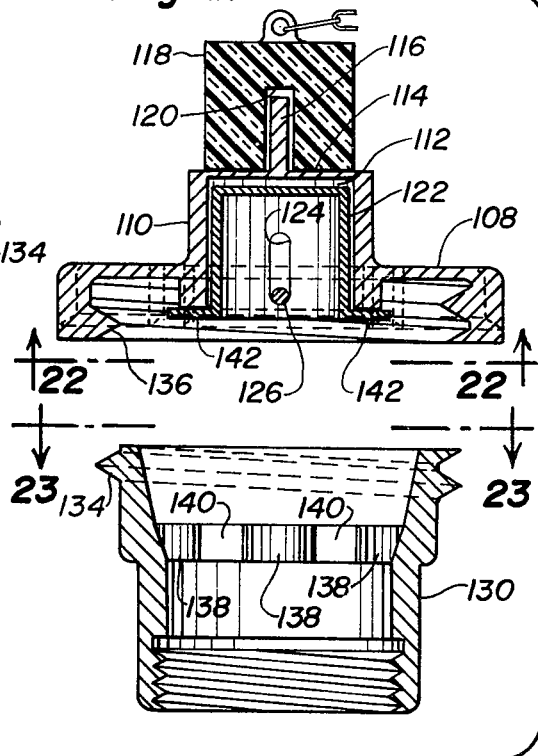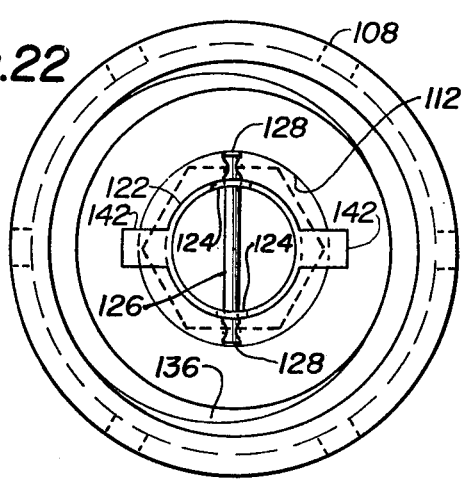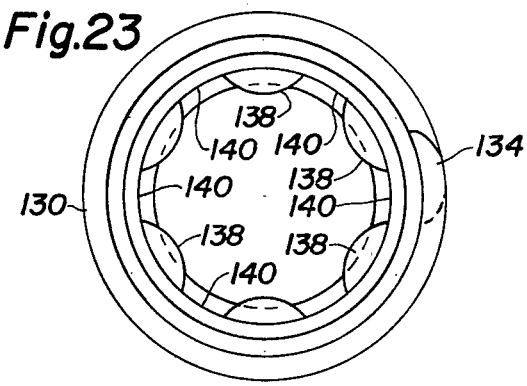

RELEASABLE LOCKING MEANS FOR CLOSURE CAPS

This application is a continuation-in-part of Ser. No. 963,584, filed Nov. 24, 1978, now abandoned.

BACKGROUND OF THE INVENTION

The present invention may be used in general with cup-shaped caps attachable to hollow circular members, such as fill pipes or similar means connected with fuel tanks of various kinds, stationary or mobile. It is particularly adapted for use with caps and fill pipes associated with fuel oil tanks and the like, and especially in situations where the fill pipe is disposed exteriorly of a residence or other building and normally is adapted to be manually removed. Various means have been employed heretofore to lock such caps upon the fill pipes to prevent children or other unauthorized persons from removing the cap. One means which has been employed comprises having a lock of suitable type installed in the cap and operable by a key. Even if the lock is the type which might be operated by a master key carried by the oil deliveryman, it, nevertheless, necessitates the deliveryman having the key at the time of delivery, and particularly if the key is not of the master type, it requires the deliveryman to carry a great quantity of keys and this is too much of a nuisance and is otherwise unworkable for practical purposes. Therefore, to a large extent, no practical means presently are employed in the oil delivery field or the automotive field for locking caps upon delivery pipes, except by using a key. A tight fit of the cap upon the fill pipe which requires a wrench to loosen the same is the system commonly employed at present, but there is still a need for locking the cap upon the fill pipe and the purpose of the present invention is to supply a practical means to fill that need.

Another problem incident to the oil delivery business comprises the fact that when snow of any substantial depth surrounds the fill pipe and cap, it is necessary for the deliveryman to find the cap, remove it, and frequently the cap is lost in the snow and it has been found from practical experience that each year many caps are lost in this manner and are not recovered until the snow melts to reveal the cap. Accordingly, the present invention includes means to obviate such difficulty.

In the prior art, key-operated caps or closures have been developed heretofore. One example of this structure is disclosed in U.S. Pat. No. 738,917 to Kempien, dated Sept. 15, 1903.

In recent years, there has been considerable development in the closure industry to develop child-proof caps for medicine bottles which can be operated by adults who are capable of reading the instructions on the caps which indicate how the cap may be removed but simple rotation of the cap is ineffective to do so when an attempt to unscrew the cap is made by children. Typical examples of devices of this type are shown in the following U.S. Patents:

| | | |
|---|---|---|
| 2,847,139 | Christiansson et al | Aug. 12, 1958 |
| 2,921,705 | Dorsey | Jan. 19, 1960 |
| 3,376,992 | Klapp, Sr. | April 9, 1968 |
| 3,426,930 | Hirschler | Feb. 11, 1969 |
| 3,735,887 | Morris | May 29, 1973 |

In view of the fact that the present invention is concerned with the employment of magnetic means to actuate the locking mechanism, review of the prior art has developed only U.S. Pat. No. 3,060,786 to Flower, dated Oct. 30, 1962, in which a nut threadably connected to a bolt which extends commonly through two plate members to secure the same together employs magnet means to actuate a clutch which is movable upon the nut between locking and unlocking positions for purposes of either preventing rotation of the nut or rotating it when desired to remove the same from the bolt.

Additional prior U.S. Pat. No. 3,782,147 to Hallmann, dated Jan. 1, 1974, discloses a magnetically-operated safety lock, and U.S. Pat. No. 3,837,525 to Kobayashi, dated Sept. 24, 1974, discloses a case having a magnetic lock means.

SUMMARY OF THE INVENTION

It is the principal object of the invention to provide a limited number of embodiments of magnetically-operable locking means to prevent the rotation of a cap relative to a hollow circular member, such as the inlet end of a fill pipe which normally is disposed vertically, and in which the closure cap is formed of non-magnetic material and includes means supporting a normally vertically movable locking member of ferrous material but said locking member being non-rotatable with respect to the cap, the locking member on the lower end thereof having means to engage fixed members in the receiving end of the hollow circular member which, when in engagement with each other, prevent rotation of the cap with respect to the hollow circular member but the ferrous nature of the locking member permits raising the locking member from engagement of its lower end with said fixed means in the hollow circular member when a magnet of suitable strength is placed upon said cap.

It is another object of the invention to form the lower end of the locking members of certain embodiments with a slot which receives a transverse bar or pin fixed in the receiving end of the hollow circular member to prevent relative rotation therebetween when the pin is disposed in said slot.

It is a further object of the invention to provide several embodiments of configurations on the lower end of the locking member in the form of oppositely-extending projections of limited length which are respectively received within recesses stationarily formed within the hollow circular member adjacent the inlet end thereof and thereby enabling the present invention to be employed with several different types of existing arrangements in the receiving ends of hollow circular members, such as fill pipes or fittings attached thereto, whereby it is only necessary to provide several embodiments of caps respectively having locking members included therein for application to the several different type of hollow circular members or fittings referred to above.

Still another object of the invention is to provide a magnet of sufficient strength to actuate the locking members of said cap referred to above, said magnets, in the preferred embodiments of the invention, being mounted within a wrench which otherwise is provided with means to engage elements on the cap which interfit therewith in a manner to permit the wrench to unscrew the cap from the hollow circular member, such as a fill pipe, after the magnet has moved the locking member to disengage the lower end thereof from the means in the upper end of the fill pipe with which it has been in locking engagement, prior to the application of the wrench to the cap. In regard to this object of the invention, several different embodiments of wrench arrangements are included respectively for engaging elements on several different types of caps which are presently in use in the oil delivery industry but in which caps no locking means are included which prevent rotation of the cap with respect to the upper end of the fill pipes.

One further important object of the invention ancillary to the object described immediately above is that the magnet preferably is arranged in the head of the wrench so as to also be engageable, for example, with the upper end of a ferrous fill pipe and thereby being releasably attachable to the upper end of a ferrous fill pipe after the cap has been removed and is held magnetically by the wrench, whereby the magnet will magnetically hold the wrench and attached cap to the fill pipe so that it will not be lost in snow or otherwise, as well as being conveniently accessible by the deliveryman for replacement of the cap in closed position on the fitting with which it is threadably or otherwise connectable.

Other further objects of the invention are to provide means in the various embodiments of caps and the locking means therein by which water may not drain into the locking mechanism and subsequently freeze therein, as well as additional means which, if freezing within the cap occurs, can be fractured by a wrench when applied to the cap and thus permit access to the fitting and fill pipe.

Still further objects are to provide in certain embodiments locking members which comprise cup-shaped steel stampings mounted slidably in inverted manner within a socket formed in the caps and retaining means extends across said socket and is received in slot means in the walls of the locking members to permit limited axial movement of the locking members between operative locking position and inoperative releasing position relative to fixed locking configurations in the circular members to which the caps are connectable, the locking members being movable from locking to releasing position by magnetic attraction.

One other object is to provide a special type of permanent magnet which is convenient for a deliveryman to carry and complementary means are provided on the cap for the fill pipe which permits the use only of said special magnet and otherwise prevents application of a conventional permanent magnet in any attempt to release the locking means for the cap.

Details of the foregoing objects and of the invention, as well as other objects thereof, are set forth in the following specification and illustrated in the accompanying drawings comprising a part thereof.

BRIEF DESCRIPTION OF THE DRAWINGS

FIG. 7 is top plan view of a second embodiment of cap employing the principles of the present invention and showing certain details thereof in phantom.

FIG. 8 is a side elevation of the embodiment of cap shown in FIG. 7, as seen on the line 8—8 adjacent FIG. 7.

FIG. 9 is a vertical sectional view of the embodiment of cap shown in FIGS. 7 and 8, as seen on the line 9—9 of FIG. 7, the upper end of an exemplary fill pipe being shown in phantom in said figure.

FIG. 10 is a fragmentary vertical sectional view of one embodiment of the upper end of a fill pipe in which a fitting which includes one element of the locking means of the present invention threadably mounted in the upper end of the fill pipe, said view being taken on the line 10—10 of FIG. 11.

FIG. 11 is a top plan view of the fill pipe and fitting shown in FIG. 10.

FIG. 12 is a fragmentary side elevation of another embodiment of wrench employing the principles of the present invention and being a type adapted to engage the cap shown in FIGS. 7-9, the embodiment of cap shown in the latter figures being illustrated in phantom in said figure.

FIG. 13 is a fragmentary bottom plan view of the wrench shown in FIG. 12, as seen on the line 13—13 of said figure.

FIG. 17 is a top plan view of the cap and circular member of the first of several further embodiments of the invention and illustrates one form of complementary positioning means on the cap for the special magnet shown in FIG. 18.

FIG. 18 is a side elevation of a special type of magnet for use with the embodiment shown in FIGS. 18 and 20-23.

FIG. 19 is a top plan view of the special magnet shown in FIG. 18.

FIG. 20 is a vertical sectional view of the embodiment shown in FIG. 17 as seen on the line 20—20 thereof and showing the locking member in operative locked position.

FIG. 21 is a vertical sectional exploded view of the separated cap and circular member of the embodiment shown in FIG. 20 with the magnet of FIGS. 18 and 19 applied to the cap and holding the locking member in inoperative, released position for separation of the cap from the circular member.

FIG. 22 is a bottom plan view of the cap per se shown in FIG. 21, as seen on line 22—22 thereof.

FIG. 23 is a top plan view of the circular member per se shown in FIG. 21, as seen on line 23—23 thereof.

DETAILS OF THE PREFERRED EMBODIMENTS OF THE INVENTION

Figure 1:
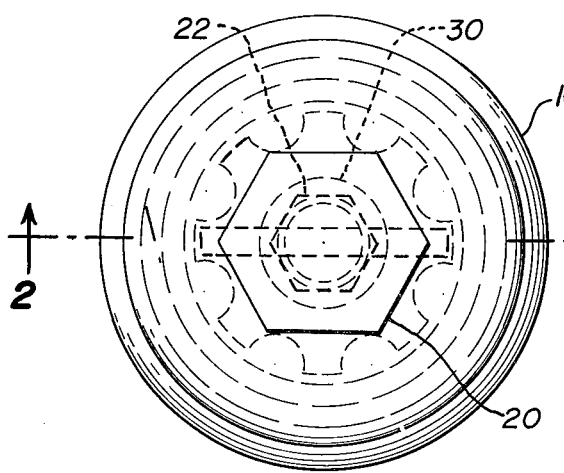
FIG. 1 is a top plan view of one embodiment of cap for the upper end of a fill pipe or the like and illustrating in phantom features of one form of locking means, including the principles of the present invention.
Figure 4:
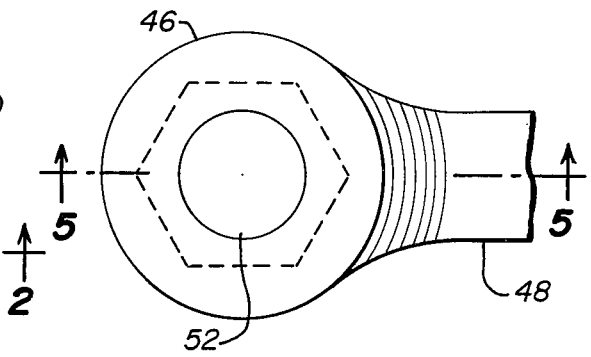
FIG. 4 is a fragmentary plan view of one embodiment of wrench comprising part of the present invention, said wrench being the type applicable to the cap shown in FIGS. 1 and 2.
Figure 2:
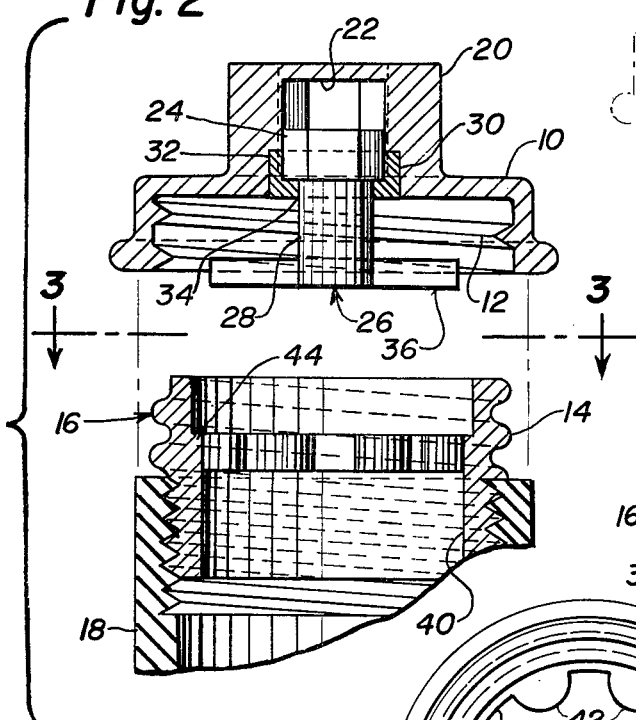
FIG. 2 is a fragmentary vertical section comprising an exploded view, showing said one embodiment of the invention, as seen on the line 2—2 of FIG. 1.
Figure 6:
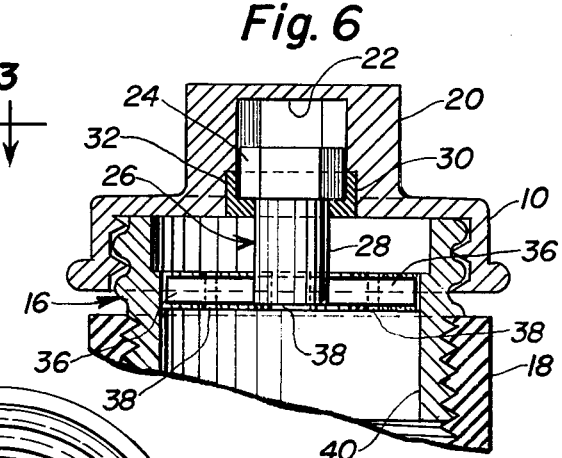
FIG. 6 is a fragmentary vertical elevation similar to FIG. 2 but showing the cap and upper end of the fill pipe and fitting in locked coengagement with each other.
Figure 3:
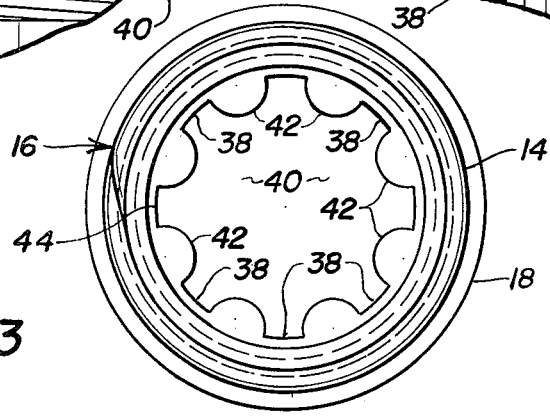
FIG. 3 is a plan view of the upper end of the fill pipe and fitting shown in FIG. 2, as seen on the line 3—3 thereof.

As indicated above, the present invention comprises a plurality of basically similar embodiments of caps adapted to be releasably connected to the upper ends of hollow circular members, such as fill pipes for oil tanks and the like, as well as other types of containers having fill pipes or fittings upon which cup-shaped caps are mounted by various means, to close the same. One embodiment of the invention is shown in FIGS. 1–6, a second embodiment is shown in FIGS. 7–13, and two further embodiments are shown respectively in FIGS. 17–23 and 24–28. Details of the first embodiment shown in FIGS. 1–6 are as follows:

Referring to FIGS. 1, 2 and 6, it will be seen that said first embodiment of the invention comprises a circular cap 10 which preferably is formed from non-ferrous material, such as zinc, or otherwise. Said cap is cup-shaped and is provided with threads 12 within said cup-shaped interior, said threads being coengageable with complementary threads 14 on the upper end of a circular member, such as a fitting 16, which also preferably is made from non-ferrous material, such as that from which the cap 10 is formed, and the opposite end from that upon which the threads 14 are formed is also threaded with preferably less coarse threads than threads 14 for threaded engagement with the upper end of a hollow circular member 18, such as the upper end of a ferrous fill pipe, which extends from a container, such as a fuel tank or the like. It is to be understood that, if desired, threads, such as the complementary threads 14, may be directly formed on the exterior of the fill pipe 18.

The embodiment of cap 10 also is provided with an upstanding projection 20, which, in cross-section, as best shown in FIG. 1, is a geometric figure, such as a hexagon, but other forms may be used, if desired. Projection 20 is provided with a cavity or socket 22 which is axial therein and, in cross-section, also is of a geometric configuration, such as an exemplary hexagon. Said cavity 22 receives and supports one end 24 of an axially movable locking member 26. The configuration of the end 24 is complementary to that of the socket 22, the configurated end 24 of the locking member being axially slidable a limited distance within the socket 22.

Extending from the configurated end 24 of the locking member 26 is a section 28, which preferably is circular, and is of a smaller diameter than the transverse dimension of the configurated end 24 of the locking member. To prevent separation of the locking member 26 from the cap 10, it will be seen from FIGS. 2 and 6 that the cap 10 is provided with a circular bore 30 within which a retaining member 32 is mounted, such as by press fitting, the member 32 having a seat in the upper end thereof which is complementary to the configurated end 24 of the locking member and is in vertical alignment with the socket 22 and actually comprises an extension thereof. The retaining member also is provided with a circular opening 34 through which the section 28 of the locking member 26 extends slidably, the walls of the bore 34 defining part of a seat against which the lower portion of the configurated end 24 of the locking member abuts to limit axial movement of the end 24 within the socket 22, for the following purpose:

Extending transversely and diametrically in opposite directions from the lower end of the locking member 26 is a configuration 36 which, if desired, may comprise a transverse bar or pin constituting locking means on the locking member 26 for engagement of the opposite ends of the configuration 36 within a series of pairs of diametrically-opposed recesses 38 disposed in the central opening 40 of the fitting 16, said recesses 38 preferably being formed between a series of rounded projections 42 which extend from an annular flange 44 which, as shown in FIG. 2, is disposed at a predetermined level for the following purpose:

Referring to FIG. 6, the vertical dimension of the socket 22 is such that a limited amount of movement of the locking member 26 is permitted. This movement is such that when the configurated end 24 of locking member 26 is disposed against the seat in retaining member 32, as shown in said figure, the opposite ends of transverse configuration 36 will be disposed in a pair of the diametrically-opposed recesses 38 in the annular flange 44 and thereby prevent rotation between the configuration 36 and the fitting 16. Correspondingly, due to the geometric configuration of the socket 22 and the configurated end of the locking member 26, no relative rotation exists therebetween and thus, cap 10 is secured in locked position with respect to the fitting 16 and the circular member 18.

It is assumed, for purposes of the present invention, that at least the upper end of a fill pipe, such as the circular member 18, normally is disposed vertically. Under such circumstances, the locking member 26 is movable axially relative to the cap 10 by gravity. Also, the axial dimension of the socket 22 in the projection 20 of cap 10 is sufficiently greater than the vertical dimension of the annular flange 44 that the locking member 26 may be moved upward and thereby dispose the configurated end 24 of the locking member 26 in the upper portion of the socket 22 and thus, disengage the opposite ends of the transverse locking configuration 36 from the recesses 38 in the annular flange 44. When this has occurred, the cap 10 may be removed by unscrewing the same from the fitting 16.

Movement of the locking member 26 into so-called unlocking position, as described immediately above, is preferably effected by magnet means. For convenience, such magnet means are mounted in the head 46 arranged on one end of a wrench handle 48. The head 46 is provided with a socket 50 which, in cross-section, is readily complementary to the cross-sectional shape of the projection 20. The magnetic force to move the locking member as described above is provided by a preferably permanent magnet 52 which, for its size, is of a powerful type that is adequate, when the wrench is disposed with respect to the cap 10 as shown in FIG. 5, so configurated end 24 of the ferrous locking member 26 is moved upward, as shown in FIG. 5, and in which position the transverse locking configuration 36 has been removed from reception of the opposite ends thereof in the recesses 38 of fitting 16.

Figure 5:
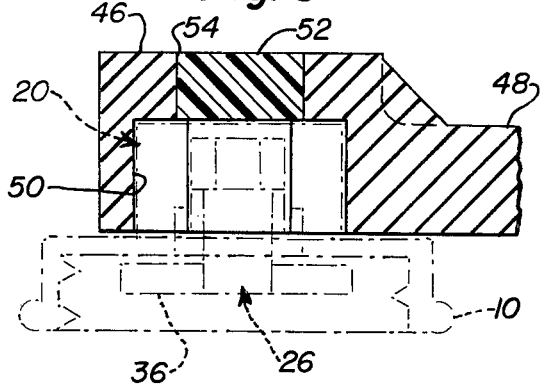
FIG. 5 is a fragmentary vertical sectional view, as seen on the line 5—5 of FIG. 4, and showing in phantom the embodiment of cap illustrated in FIGS. 1 and 2.

It will be observed from FIG. 5 that the magnet 52 is press-fitted or otherwise securely disposed within an opening 54 in the head 46 of wrench 48 in order that one end of the magnet can be brought into direct abutment with the upper end of the projection 20 of cap 10, while the outer face thereof is exposed and may be positioned in abutment with a ferrous member, such as the fill pipe 18, which otherwise is described herein as a hollow circular member. Conventionally, fill pipes are made of ferrous material and thus, when the magnet 52 is brought adjacent the outer surface of the member 18, it will adhere thereto and, simultaneously, as a second function, will hold the cap 10 securely attached to the head 46 of wrench 48, and thereby conveniently retain the same supported as described so that the cap may readily be removed from the wrench when a filling operation has been completed and it is desired to replace the cap on the fitting 16.

At the time of replacement, it is preferred that the wrench be utilized with respect to the cap 10 in order to hold the locking member 26 in so-called retracted or inoperative position, whereby when the cap 10 has been completely and firmly screwed onto the fitting 16, the locking configuration 36 will be out of contact with the recesses 38 and thus, not interfere with the threading of the cap onto the fitting 16. However, upon removing the wrench from the cap 10, the locking member 26 will drop by gravity to the position shown in FIG. 6, and thereby dispose the opposite ends of the transverse locking configuration 36 within an opposed pair of the recesses 38 in order to secure the cap upon the fitting 16 in locked position. To insure that the ends of the locking configuration 36 are disposed in such recesses 38, the wrench head 46 may be lifted from the position shown in FIG. 5 in which the projection 20 is fully disposed in the socket 50 and under such circumstances, the spacing of the magnet 52 from the upper end of the projection 20 will so decrease the force thereof that the cap may be at least slightly rotated by the wrench to test whether the locking engagement of the configuration 36 with recesses 38 has been effected and if it has not, the cap 10 may be rotated a partial revolution sufficient to permit the ends of the locking configuration 36 to drop into an opposed pair of the recesses 38 as aforesaid, after which the wrench is completely removed from the cap and the cap is locked against rotation with respect to fitting 16 and the hollow circular member 18.

The second embodiment of the invention shown in FIGS. 7–13 includes, basically, the same locking principles as that of the configurations shown in FIGS. 1–6 but, because of the somewhat different nature of the cap 56 and the means which secures it to the hollow circular member 57, a different arrangement of coengaging locking means is included from that shown in the first embodiment of FIGS. 1–6. Details of the second embodiment are as follows:

As in regard to the preceding embodiment, the cap 56 preferably is made from non-ferrous material such as zinc, or otherwise. In cross-section, as seen in FIGS. 8 and 9, the cap 56 is somewhat T-shaped and includes a top 58, the periphery of which is provided with a series of recesses 60 which facilitate manipulation of the cap and particularly for purposes of tightly connecting the same to the upper end of the hollow circular member 57, such as a fill pipe that extends to a tank, or a fitting 62, such as shown in FIG. 10, which may be threaded into the upper end of a fill pipe such as circular member 57. Extending axially from the top 58 of the cap 56 is a tubular projection 64 which is integral with the top 58 and is provided in opposite sides thereof, extending upward from the lower end thereof, with bayonet-type slots 66 by which the cap is connected to a transverse pin or bar 68 which, as shown in phantom in FIG. 7 and in sectional end view in FIG. 10, is disposed diametrically within the central opening 70 of the circular member 57 or fitting 62. Accordingly, when the projection 64 is inserted in the circular member 57 or fitting 62, the lower open ends of the bayonet-type slots 66 are coincided with the transverse bar 68 so as to permit lowering of the tubular projection 64 into the upper end of the circular member or fitting and when the bar 68 engages the upper ends of the vertical portions of said bayonet-type slots, the cap then may be rotated about its axis to dispose the inner extremities of the bayonet slots against the bar 68 and thereby tightly secure the cap to the circular member 57 or fitting 62. Further, to effect the tight connection and prevent ingress of inclement weather or escape of fumes from the tubular member or fitting, a compressible gasket 72 is provided within a suitable recess in the under surface of the top 58 of cap 56 for direct engagement with the upper end of the circular member 57 or fitting 62.

The locking means for the embodiment of the invention shown in FIGS. 7–13 includes a locking member 80, one end 82 of which is of a geometric configuration in cross-section complementary to the configuration of socket 74 and is axially movable therein a limited distance controlled by a stop flange 84 through which the lower portion of the locking member 80 extends, as clearly shown in FIG. 9, said lower end having a transverse slot 86 formed therein, which extends upward from said end.

As in the preceding embodiment, the movement of the end 82 of the locking member 80 within the socket 74 has limited vertical extent. When the locking member is in the lowered, locking position, such as shown in FIG. 9, the slot 86 receives the transverse bar 68 and, due to the non-rotatable coengagement of the end 82 with the socket 74, the cap 56 is rendered locked against rotation with respect to either the circular member 57 or fitting 62. However, when the locking member 80 is raised, such as to the position shown in FIG. 12, in phantom, the slot 86 will be disengaged from the transverse bar 68 and thereby permit rotation of the cap 56 relative to the circular member 57 or fitting 62 and thus, permit removal of the cap therefrom.

Also, as in regard to the preceding embodiment, movement of the locking member 80 as aforesaid is effected by a wrench 88 having a head 90 from which a pair of lugs 92 extend, as best shown in FIG. 12 and FIG. 13, said lugs being positioned to extend into a pair of diametrically opposed recesses 60 and thereby permit the wrench to rotate the cap 56. The wrench 88 also includes a permanent magnet 94 fixedly mounted within the complementary recess in the head 90, as shown in FIG. 12, the lower face of the magnet 94 being flush with the lower surface of the head 90 which is between the lugs 92 and, when the head 90 is disposed against the upper face of the cap 56, the limited thickness 96 of the cap or plug 78, which defines the upper end of the socket 74, is such that the force of the magnet 94 is ample to move the locking member 80 from the locked position shown in FIG. 9 to the unlocked position shown in FIG. 12 and in which latter position, the wrench freely may rotate the cap 56 to unlock it and remove it from the upper end of the circular member 57 or fitting 62.

If preferred, the magnet 94 may extend entirely through the head 90, rather than within the socket shown in FIG. 12, so as to permit support of the wrench by the magnet when the wrench is disposed against a ferrous member, such as the hollow circular member 57, comprising a conventional fill pipe and, simultaneously, hold the cap within the wrench as explained in detail above with respect to the preceding embodiment.

Testing of whether the locking member is in locked position with respect to the transverse bar 68 also may be accomplished as described above with respect to the preceding embodiment and thus, it will be seen that the embodiment of the invention shown in FIGS. 7-13 has all of the attributes of the locking characteristics of the embodiment shown in FIGS. 1-6.

Figure 14:
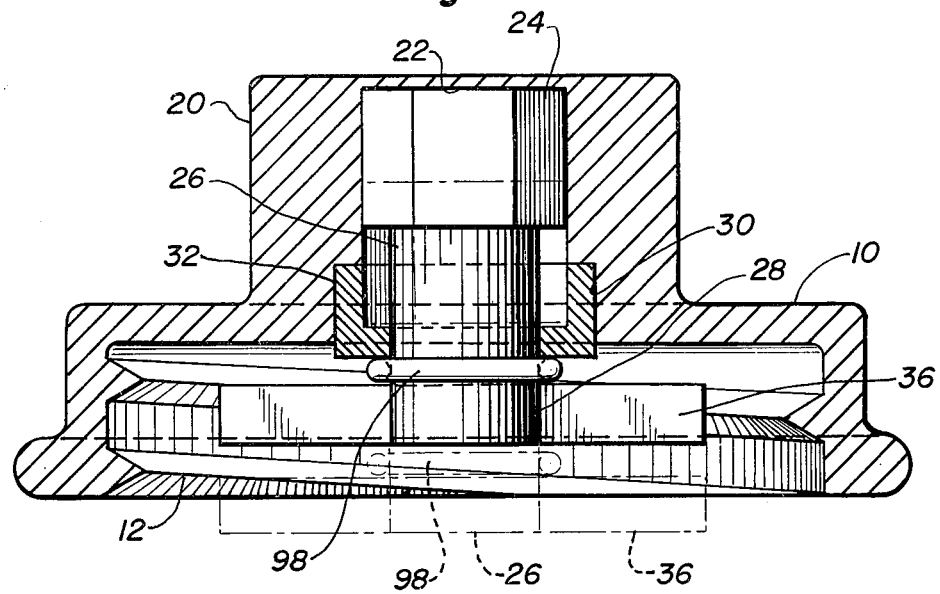
FIG. 14 is a side elevation of the embodiment of FIGS. 1-6 with moisture barrier and wrench-releasable means.

There are certain circumstances in which it is possible for the caps of the several embodiments of the invention described above to possibly have water enter the same, particularly in regard to the locking members, such as locking member 26 of the first embodiment, and locking member 80 of the second embodiment. In the event water should enter the recesses within which the heads of said locking members particularly are intended to function, and the same becomes frozen, especially when the locking members are in locked position, then the same will be rendered incapable of being elevated from the locking position when the magnet in the wrench is applied thereto. To safeguard against such situations occurring in regard to both embodiments, attention is directed to FIGS. 14-16 in which further innovations have been incorporated in both of these embodiments primarily for purposes of keeping water from accumulating therein under any circumstances and, secondly, in the event water does accumulate and freezes, there are means provided by which the caps may be removed from the fittings or fill pipes with which they are connected, details of these additional innovations being as follows:

Referring to FIG. 14, in which cap 10 of the embodiment of FIGS. 1-6 is shown, it will be seen that in full lines, the locking member 26 is in the raised position with the head end 24 thereof disposed uppermost within the cavity or socket 22 and in phantom, the same is in the lower or locking position.

In this embodiment of the invention, the section 28 of locking member 26 which is cylindrical and extends between the end 24 of member 26 and the locking configuration 36 thereof, sealing means have been included in the form of an O-ring 98, which is positioned thereon so that when the locking member 26 is in the raised position in which it is held by the magnet of the wrench, the O-ring 98 will abut the lower surface of the retaining member 32, as shown in full lines, and thereby, prevent water from entering the cavity or socket 22. When the cap is held by the magnet of the wrench, the locking member will be retained in the latter position and, when the cap is restored to locking position with the fitting 16 or upper end of the cylindrical member 18 in the event threads are externally formed thereon for that purpose, it is only then that the locking member will fall into locking position, and even if some moisture had occurred on the interior of the threaded portion of the cap, it cannot enter the cavity or socket 22.

If for any reason, however, the locking member 26 should be frozen when in the locked position and will not respond to the force of the magnet in the wrench to elevate it for removal of the cap, this embodiment of the invention then is provided with a transverse locking configuration 36 formed from suitable metal alloy or hard, tough plastic that has sufficient strength to prevent rotation of the cap by normal manual engagement thereof but when the wrench 48 is applied to the projection 20 of the cap and the wrench is rotated, the transverse locking configuration or member 36 is capable of either being sheared or bent adequately that the ends thereof will no longer be disposed in the recesses 38 of the fitting 16 and continued rotation of the cap may occur for the removal thereof from the fitting.

Under the foregoing circumstances, it will be necessary for the oil deliveryman to have a new cap on the truck available to replace the old one that has been damaged from forcing the removal thereof from the fitting, and the same may be reconstituted appropriately, if desired, at small expense. In any event, however, removal of the cap with a frozen locking member therein can be accomplished by the means described above.

Figure 15:
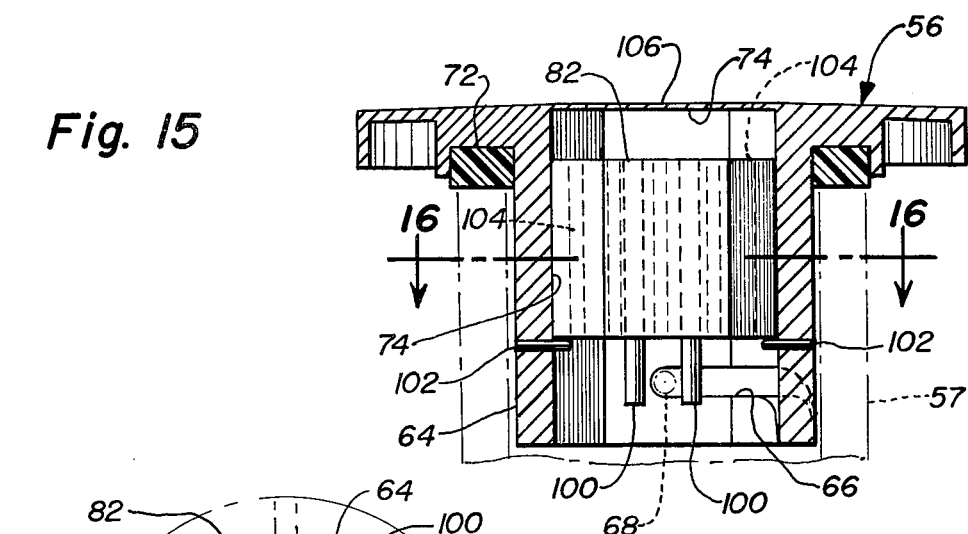
FIG. 15 is a side elevation of the embodiment of FIGS. 7-13 with a modified locking member to permit wrench actuation to overcome frozen conditions.
Figure 16:
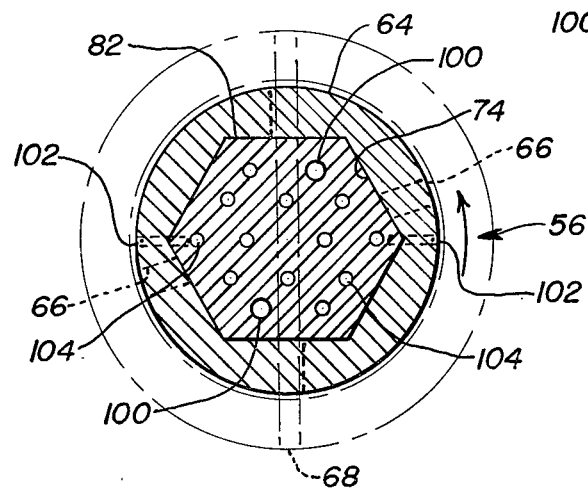
FIG. 16 is a sectional view through FIG. 15, as seen on the line 16—16 of said figure.

Referring to the embodiments shown in FIGS. 7-13, for purposes of rendering the same substantially waterproof or at least to construct the same so that the possibility of water accumulating therein and freezing is minimal, additional changes are included in the cap from those illustrated specifically in FIGS. 7-13, and such changes are shown in FIGS. 15 and 16, as follows:

The cap 56 is provided with a somewhat different axial cavity or socket 74 which extends preferably for the full length of the tubular projection 64, as clearly shown in FIG. 15. It will be understood that the cavity of socket 74 will be of a geometrical configuration in cross-section, such as a hexagon. However, the exterior surface of the projection 64 is cylindrical in order that it will fit and rotate within the upper end of the hollow circular member 57, which is shown in phantom.

In this embodiment also, the head end 82 of the locking member preferably is of greater length than the head 82 as illustrated in FIGS. 8 and 9, for example, and the same is complementary in cross-section to the configuration of the cavity of socket 74, such as a hexagon and freely slidable within said cavity or socket. The purpose of making the head 82 of greater extent than the corresponding head in FIGS. 8 and 9 is to provide additional weight to insure lowering of the same into locked position, it being understood that in the embodiment illustrated in FIGS. 15 and 16, different locking means are provided on the head 82 which comprises the locking member in this embodiment, as follows:

Rather than employ a transverse slot 86 in the locking member as in the embodiment shown in FIGS. 8 and 9, for example, the locking means for the embodiment of FIGS. 15 and 16, comprises a pair of locking pins 100 or "Rollpins" which, as illustrated in FIG. 16, are shown in straddling relationship with respect to the transverse pin or bar 68, as shown in FIG. 11, for example, extends across the interior of the hollow circular member 57. In such arrangement, the pins 100 are located in the head 82 strategically so that when the bayonet-type slots 66 have received the pin 68 and the cap has been rotated into locked position with the transverse pin or bar 68, the pins 100 then will be disposed with respect to said bar to prevent rotation of the cap in unlocking direction which is illustrated by the directional arrow, shown in FIG. 16.

In order to limit the axial movement of the head 82 of the locking member, which also includes the pins 100, a pair of movement-limiting pins 102 is provided in the tubular projection 64 which is positioned therein to position the member 82 in its lower position so that the pins 100 are at a level to engage the transverse pin or bar 68. Pins 102 also may be threaded set screws which facilitate both installation and removal of heads 82.

In the event moisture should occur within the axial cavity or socket 74 from any source, it will be seen that the member 82 is provided with a plurality of drainage holes 104, whereby when the cap is in locked position in which it is vertical, any moisture occurring in the upper end of the cavity 74 may drain through the holes 104 by gravity and fall into the circular member 57.

Referring to FIGS. 17–23 which illustrate the first of two additional embodiments of the cap locking means of the present invention, it will be seen from FIGS. 20 and 21 that the circular cap 108, which is similar to cap 10 of the embodiment shown in FIGS. 1–6 also is provided with a projection 110 that, in plan view, as shown in FIG. 17, is a polygon to adapt the same to being rotated by means of a wrench, if necessary or desired. As in the preceeding embodiments, the cap 108 is formed of non-ferrous material, preferably to render the same non-rusting. Projection 110 also contains a cavity 112 which opens downwardly as viewed in FIGS. 20 and 21 and preferably is cylindrical. Further, the upper wall 114 which forms the top of the projection 110 is relatively thin. A rib 116 extends perpendicularly upward from the upper wall 114 of projection 110 and constitutes positioning means for a special type of permanent magnet 118 which, as best shown in FIGS. 18 and 21, has a central slot 120, which is complementary to the rib 116 and accommodates the same when the magnet is placed upon the top of projection 110 for purposes to be described.

The cavity 112 of the cap 108 contains a cup-shaped locking member 122 which is complementary to the cavity as to length and diameter but is freely slidable therein axially, whereby adequate clearance is provided between the walls of the cavity and exterior of the locking member. Further, movement-limiting means for the locking member 122 in an axial direction is effected by slot-like means 124 formed in opposite sidewall portions of the locking member 122 and through which a transversely positioned member comprising a pin 126 extends. The length of the slots 124 is sufficient to enable the locking member 122 to move between the retracted, inoperative position thereof, shown in FIG. 21, and the extended or projected operative position shown in FIG. 20. Further, by referring to FIG. 22, it will be seen that the lower end of the portion of the cap which contains the cavity 112 has shallow slots 128 therein to receive the opposite ends of the pin 126 and the sidewalls of said slots are peened toward each other to retain the pin connected to the cap as is readily seen in FIG. 22.

The embodiment of the invention shown in FIGS. 17–23 includes a hollow circular member 130 which, specifically, is internally threaded at the lower end thereof for attachment to complementary threads on a fill pipe 132, or the like. It will be understood that if desired, the member 130 may be externally threaded and the fill pipe 132 internally threaded and of suitable diameters to permit the elements to be threaded together. Further, the upper end of member 130 is provided with relatively coarse external threads 134, which are complementary to the internal threads 136 within cap 108. The member 130 is provided with a fixed locking configuration comprising a plurality of similar rounded projections 138, between which similar recesses 140 are formed for co-action with a pair of oppositely disposed locking ears 142, which extend in opposite directions from the lower end of the locking member 122.

The locking member 122 is formed from ferrous material and may be inexpensively manufactured, for example, by appropriate stamping operations and the locking ears 142 are integrally included therewith and formed thereon, by any appropriate industrial means. Being of ferrous material, the inner end of the locking member 122 will be attracted by the magnet 118 when placed upon the upper wall 114 of the projection 110 on cap 108, thereby moving the locking member to the inoperative position thereof, shown in FIG. 21, and in which the ears 142 will abut the lower end of the portion of the cap which contains the recess 112. When, however, the locking member is not under the influence of the magnet 118, and assuming that the hollow circular member 130 is mounted substantially vertically, when installed upon a suitable tank or other similar form of container, the locking member 122 will be in the operative, projected position, shown in FIG. 20 and in such position, the projecting ears 142 will be disposed in a pair of opposed recesses 140 and thereby prevent relative rotation between the locking member and the hollow circular member 130. Further, the pin 126, which extends through the slots 124 will prevent relative rotation between the locking member and the cap 108 and hence, the arrangement just described will prevent normal rotation between the cap and hollow circular member 130, and at least will prevent manual removal of the cap from the circular member 130. However, if through some conceivable malfunction, it is not possible for the magnet 118 to elevate the locking member 122 to its inoperative releasing position shown in FIG. 21, either the pin 126 and/or the ears 142 may be bent or otherwise deformed or fractured when a wrench is applied to the projection 110 on cap 108, and thus, permit the cap to be removed from the hollow circular member 130 and provide access to the fill pipe 132, for example.

Referring to FIGS. 24–28, the second of the aforementioned pair of further embodiments of releasable locking means for closure caps is illustrated, and in which a cap 144 is shown particularly in FIGS. 24–27, said cap generally being similar basically to cap 56, shown in FIGS. 8 and 9, in that it includes a pair of opposite bayonet slots 146 formed in the tubular projection 148, in which a cavity 150 is formed axially thereof and the upper wall 152 is very thin, as in the wall 114 of the cap shown in FIGS. 20 and 21, for similar purposes of the latter wall. It also will be understood that the cap 144 is formed from non-ferrous material, as in regard to the other caps of the preceeding embodiment.

Figure 25:
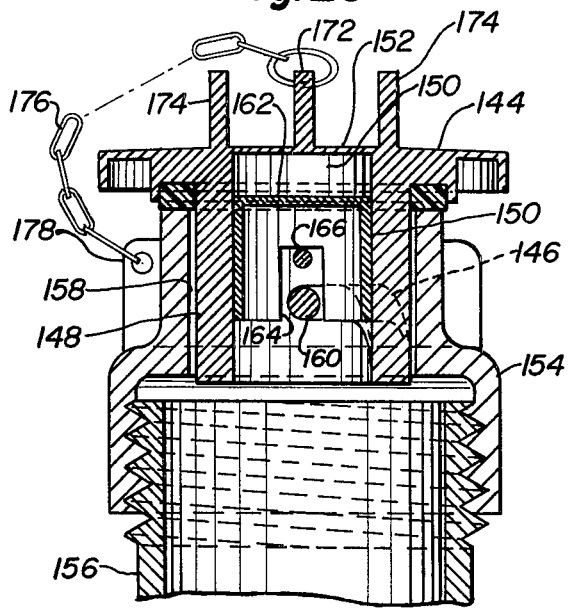
FIG. 25 is a vertical sectional view of the embodiment shown in FIG. 24, as seen on the line 25—25 thereof and showing the locking member in operative, locked position.

The cap 144 cooperates with hollow circular member 154, the lower portion thereof being internally threaded for co-action with the threads on the upper end of exemplary fill pipe 156, as shown in FIG. 25. The upper portion of the member 154 has an internal cylindrical bore 158, which slidably receives the tubular projection 148 of the cap. Extending transversely and preferably diametrically through opposite sides of the bore 158 of member 154 is a bar 160 with which the bayonet slots 146 coact to secure the cap 144 to the circular member 154 by conventional operation of the bayonet slots 146.

Reciprocally and axially within the cavity 150 is a cupshaped locking member 162 which basically is similar to the locking member 122 of FIGS. 20 and 21, the locking member 162 also having slot-like means in the form of a downwardly opening pair of slots 164 which receive a transverse pin 166 which extends diametrically across the cavity 150, the opposite ends thereof being disposed within suitable holes drilled in the walls of the tubular projection 148. The pin 166 is substantially smaller in diameter than the bar 160 and serves to limit relative rotation between the locking member 162 and the cap 154 to a very few degrees of rotation. Also, the length of the slots 164 is such that when the locking member 162 is in the lower, operative locking position, the lower end of the slots 164 will receive the transverse bar 160 and due to the fact that the pin 166 is also disposed in the upper ends of said slots 164, relative rotation between the cap 144 and circular member 154 will be restricted to a very few degrees of rotation and completely insufficient to disconnect the cap 144 from the circular member 154 by separation of the bayonet slots 146 from the bar 160.

Figure 26:
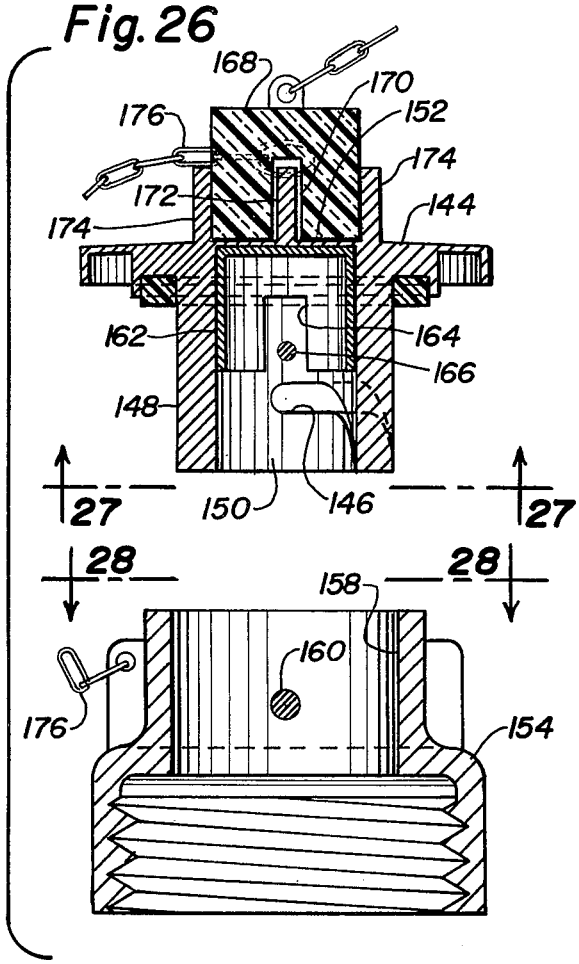
FIG. 26 is a vertical sectional exploded view of the embodiment shown in FIG. 25 with the magnet positioned on the cap and holding the locking member in inoperative, released position for separation of the cap from the circular member.
Figure 27:
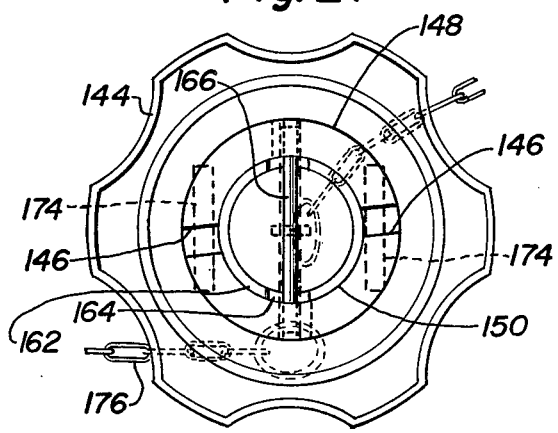
FIG. 27 is a bottom plan view of the cap per se shown in FIG. 26, as seen on line 27—27 thereof.
Figure 28:
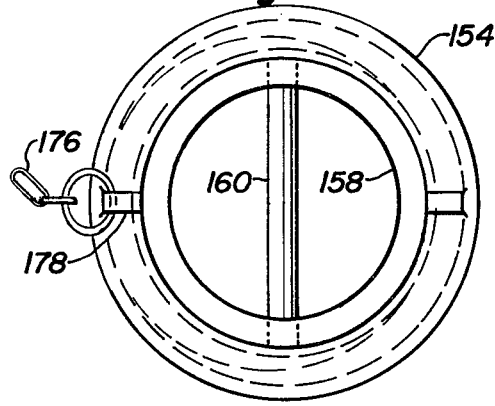
FIG. 28 is a top plan view of the circular member per se shown in FIG. 26, as seen on line 28—28 thereof.

In the embodiment shown in FIGS. 24–28, it also is contemplated that a magnet 168, which is similar to the magnet 118 in FIGS. 18, 19 and 21, is employed to move the locking member 162 from the operative, extended locking position shown in FIG. 25 to the idle or inoperative, retracted position thereof, shown in FIG. 26, in which the slots 164 have disengaged the locking bar 160 of the circular member 154 and thereby will permit the cap to be rotated to disengage the bayonet slots from the bar 160, after which the cap is moved axially from the bore 158. As in the embodiment of FIGS. 17–23, the magnet 168 is provided with a central transverse downwardly opening slot 170 which receives a central rib 172 in order that the pole faces of the magnet 168 may firmly abut the upper wall 152 of the cap to render application of the magnetic force of the magnet effectively to elevate the locking member 162 to the inoperative, unlocking position, shown in FIG. 26. In addition, however, the cap 144 also is provided with a pair of parallel side ribs 174, said ribs comprising safety means to prevent the operation of the locking member 162 by unauthorized persons attempting to use a conventional permanent magnet not having the central slot 170, such as in magnet 168, which normally is carried only by a deliveryman or the driver of an automotive vehicle, in the event the present invention is applied to fuel tanks for automobiles, trucks and the like.

Figure 24:
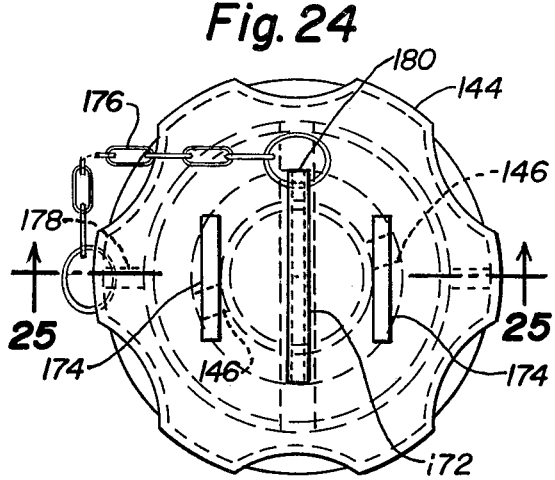
FIG. 24 is a top plan view of the second of said several further embodiments and illustrates a further form of magnet positioning means on the cap.

As a further additional precaution, the embodiment shown in FIGS. 24–28 contemplates the use of a safety chain 176, one end of which is connected to an ear 178 formed on circular member 154 and the opposite end is connected to an extension 180, see FIG. 24, of the central rib 172. The chain 176 is of sufficient length to readily permit the cap to be rotated in locking and unlocking directions relative to the circular member 154 and also permit removal of the cap from the bore 158 of member 154 but, nevertheless, will prevent the cap from permanently being disconnected from the circular member 154, whereby the same will not be lost in the event it is accidentally dropped during a filling operation and, for example, falls in deep snow in which it could become hidden.

In the event, through malfunction of any type, it is found that the application of the magnet 168 to the cap 154 fails to raise the locking member 162 to the inoperative, releasing position shown in FIG. 24, and instead, remains in the operative locking position, shown in FIG. 25, it is contemplated that an appropriate wrench, such as a spanner wrench or otherwise, may be applied to the cap 144 to effect rotation thereof, notwithstanding the locking member 162 being in the locked position thereof. To effect such separative rotation of the cap, it is contemplated that the bar 164 may be formed from suitable frangible material capable of resisting deformation or fracture when only manual force is applied to the cap 144 but, upon application of a tool such as a wrench or otherwise to the cap, the bar 160 may be fractured. If the bar 160 is fractured, it is only necessary to replace the circular member 154 with a new or rebuilt one by the deliveryman who can carry an extra supply of such members with him on the delivery truck. The installation of a new bar 160 in the circular member in which the original bar has been fractured is a simple matter effective at minimal cost.

The foregoing description illustrates preferred embodiments of the invention. However, concepts employed may, based upon such description, be employed in other embodiments without departing from the scope of the invention. Accordingly, the following claims are intended to protect the invention broadly, as well as in the specific forms shown herein.

We claim:

1. Releasable locking means for a hollow circular member open at one end and a cup-shaped closure cap of non-magnetic material complementary in shape to the exterior of said open end of said circular member and coengageable with each other by complementary coengageable securing means operable by rotation of said cap relative to said circular member, in combination with a locking member of ferrous material supported by said cap for axial movement relative thereto, means on said cap engaging said locking member to prevent rotation thereof relative to said cap but permit limited axial movement between operative and inoperative positions relative to said circular member when said cap is secured thereto, said circular member having a fixed locking configuration therein, and said locking member on said cap having securing means thereon movable therewith when moved axially and engageable with said fixed locking configuration in said circular member when said locking member is in said locking position relative to said cap, thereby to prevent rotation of said cap relative to said circular member, said locking member being movable into said operative position by gravity when said circular member is substantially vertical and said cap is secured thereto, and said locking member being movable vertically upward to said inoperative position upon application of a magnet to said cap and thereby move said securing means on said locking member axially toward said cap and disengage the same from said locking configuration in said circular member and thereby permit rotation of said cap relative to said circular member.

2. The locking means according to claim 1 in which said cap has an axial socket therein opening downward and within which said locking member is movable axially between said operative and inoperative positions relative to said cap, and means connected to said cap and engageable by said locking member to limit the movement of said locking member axially toward the open end of said socket and thereby establish the locking member in the operative position thereof.

3. The locking means according to claim 1 in which said cap has a socket within which said locking member is slidable non-rotatably and the portion of said cap comprising the bottom of said socket being relatively thin to minimize the strength of the magnet necessary to move said locking member to the inoperative position thereof, and a rib extending perpendicularly upward from the outer surface of said portion of said cap, and said locking means further including a permanent magnet having a transverse slot in one end thereof to define the poles of the magnet and said slot being complementary at least in depth to the height of said rib and adapted to receive the same when the magnet is applied to said cap to move said locking member therein to said inoperative position thereof and thereby enable the ends of the poles of said member to abut the upper surface of said portion of said cap above said socket therein.

4. The locking means according to claim 3 further including additional ribs on the outer surface of said cap parallel to but spaced transversely from said perpendicular rib substantially even distances from opposite sides thereof, the distance between the inner surfaces of said additional ribs being slightly greater than the transverse dimension of said magnet and operable to facilitate positioning said magnet upon said cap.

5. The locking means according to claim 1 in which said cap has a cavity extending axially and opening downward, said locking member being axially slidable therein, and said means in said cap to prevent rotation of said locking member but permit limited axial movement comprises slot-like opening means in said locking member and a transversely positioned member fixed within said socket and extending through said slot-like opening means and thereby prevent said rotation between said cap and locking member.

6. The locking means according to claim 5 in which said locking member is cup-shaped and inverted within said socket in said cap and opening downward and said slot-like opening means in said locking member comprising slots in opposed portions of the sidewalls of said cup-shaped member.

7. The locking means according to claim 6 in which the top portion of said cap which forms the base of the socket therein is thin to minimize the strength of the magnet needed to move said cup-shaped locking member into said socket and thereby disengage the locking member from engagement with said fixed locking configuration in said circular member and permit rotation of said cap relative to said circular member as aforesaid.

8. The locking means according to claim 6 in which said fixed locking configuration on said circular member comprises oppositely extending projections transverse to the axis of said member and forming diametrically-spaced recesses therein, and said securing means on said locking member comprising transverse projections on said locking member operable to be disposed between a transverse pair of said recesses when said locking member is in said operative position thereof within said socket in said cap, thereby to prevent rotation between said cap and circular member as aforesaid.

9. The locking means according to claim 8 in which said projections comprise a pair of ears extending outwardly in opposite directions from the outer end of said cup-shaped locking member and the length of said slots being adequate to permit said ears to move from said recesses between said projections when propelled by a magnet toward the inoperative position of said locking member.

10. The locking means according to claim 9 further characterized by said ears being sufficiently strong to resist attempts to rotate said cap manually relative to said circular member but said ears being yieldable to disengage said locking configuration in said circular member when a wrench is applied to said cap to rotate it.

11. The locking means according to claim 10 in which said cap has a projection extending upwardly therefrom centrally and the transverse cross-sectional shape comprising a polygon to provide opposed faces engageable by a wrench, said projection also containing said cavity for said locking member.

12. The locking means according to claim 5 in which said cap has a tubular projection extending axially away from the top of said cap and slidably received said locking member, said complementary coengageable securing means on said cap and circular member comprising bayonet-type slots in opposite portions of said tubular projection engageable with a bar extending transversely across the interior of said circular member and said slot-like opening means in said locking member comprising a pair of diametrically opposite slots extending upwardly from the open lower end of said locking member which when the same is in the operative position thereof receives said transverse bar in said circular member to prevent rotation of said cap relative to said circular member and thereby secures said cap in locked position upon said circular member.

13. The locking means according to claim 12 in which said slots in said locking member are sufficiently long to receive both said transversely positioned member in said socket of said cap for said locking member and said transverse bar in said circular member, wherein the common engagement of said slots with both said transversely positioned member and said transverse bar prevents said rotation of said cap relative to said circular member.

14. The locking member according to claim 13 in which said transversely positioned member in said socket of said cap comprises a pin of smaller diameter than said transverse bar in said circular member and capable of resisting manual turning movement of said cap relative to said circular member but susceptible to being fractured when a wrench is applied to said cap to rotate it for separation from said circular member.

15. The locking member according to claim 14 in which said cap has a projection which extends upward therefrom which contains said cavity for said locking member and said projection in cross-section comprising a polygon having opposed faces engageable by a wrench.

16. Releasable locking means for a hollow circular member open at one end and a cup-shaped closure cap of non-magnetic material complementary in shape to the exterior of said open end of said circular member and coengageable with each other by complementary coengageable securing means, in combination with a locking member of ferrous material supported by said cap for axial movement relative thereto and having axially-spaced geometric configurations thereon, and locking configurations on said cap and circular member respectively complementary to said spaced configurations on said locking member and extending axially a greater distance than that of the configurations on said locking member when said circular member and closure cap are connected in closed relationship, the complementary configurations on said cap and locking member being axially slidable a limited amount and also being non-rotatable relative to each other, and the complementary configurations on said circular member and locking member being movable into non-rotatable coengagement by gravity and thereby preventing rotation of said cap relative to said circular member, whereby application of a magnet to said cap serves to move said locking member axially toward said cap and disengage said locking member from said locking configuration in said circular member and thereby permit rotation of said cap relative to said circular member.

17. The locking means according to claim 16 in which said axially-spaced geometrical configurations on said locking member respectively are on opposite end portions thereof.

18. The locking means according to claim 16 in which said cap is provided with a socket closed at one end and extending axially therein and opening downward, one end of said locking member being mounted within said socket for axial slidable movement and in cross-section said socket and one end of said locking member having complementary geometric shapes to prevent relative rotation therebetween.

19. The locking means according to claim 18 in which said cap and said one end of said locking member have coengageable means to prevent separation of the same and limit the axial movement to a range adequate to effect engagement and disengagement of the complementary locking configurations respectively on the opposite end of said locking member and said circular member.

20. The locking means according to claim 19 in which the complementary locking configurations on said other end of said locking member and circular member respectively comprise oppositely extending projections transverse to the axis of said locking member and diametrically-spaced recesses within said circular member at a level engaged by said transverse projections only when said locking member is in locking position.

21. The locking means according to claim 19 in which the complementary configurations on said other end of said locking member and circular member respective comprise a slot extending transversely across and into said other end of said locking member and a bar extending diametrically across said circular member at a level at which said slot receives said bar when said locking member is in locking position.

22. The locking means according to claim 16 in combination with a wrench having a head on one end including means arranged to engage said closure cap to effect rotation thereof relative to said circular member, and said wrench including a magnet located in said head immediately opposite the end of said ferrous locking member in said cap when the cap is engaged by said head of said wrench, whereby said magnet is operable to move said locking member axially within said cap a sufficient distance to disengage said member from the locking configuration in said circular member.

23. The locking means according to claim 22 in which said cup-shaped cap is provided further with a projection extending upward from the open end thereof and provided with an interior recess in which one end of said locking member is movable axially, and the head of said wrench having an open-ended socket to receive said projection on said cap, said socket and projection in cross-section having complementary geometrical configurations to prevent relative rotation and said magnet being mounted in the head of said wrench in axial alignment with said socket therein.

24. The locking means according to claim 23 in which said magnet is a permanent magnet and extends through the head of said wrench to expose opposite ends respectively into said cavity in said wrench and the outer exterior surface of said head for contact with a ferrous surface to support said wrench and also secure said cap to said wrench while said wrench is so supported.

25. The locking means according to claim 22 in which said cup-shaped cap is provided with peripheral exterior indentations and said head of said wrench is provided with opposed projections adapted to be received respectively in diametrically positioned indentations in said cap and said magnet is a permanent magnet extending at least partially through said head of said wrench centrally of said head to effect disengagement of said locking member in said cap from the locking configuration in said hollow circular member and also provide magnetic attachment of said wrench to a ferrous surface for support thereby and to secure said cap to said wrench while said wrench is so supported.

26. The locking means according to claim 16 in which said cap is provided with a socket closed at one end and opening downward into the cup-shaped recess of said cap, one end of said locking member being mounted slidably within said socket axially and in cross-section said socket and the outermost portion of said one end of said locking member having complementary geometric shapes to prevent relative rotation, and said locking means further including sealing means positioned on said locking member for abutting engagement with the interior of said cap at the end of said socket to prevent ingress of moisture when said one end of said locking member is axially retracted into said socket to disengage the locking configurations on said other end of said locking member from the complementary configurations therefor on said hollow circular member.

27. The locking means according to claim 26 in which said sealing means is an elastic O-ring and said locking member has a cylindrical intermediate portion around which said O-ring extends for frictional adjustment.

28. The locking means according to claim 26 in which said complementary configurations on said circular member and locking member respectively comprise a transverse frangible bar and circularly-spaced recesses into a diametrical pair of which the opposite ends of said bar are received when said locking member is in locked position relative to said hollow circular member, said frangible bar having sufficient resistance to fracture or bending when manual rotation of said cap is attempted but said bar yielding to permit rotation of said cap by a wrench relative to said hollow circular member.

* * * * *